May 16, 1933. C. E. HATHORN 1,908,757
AERONAUTICAL TRUSS AND METHOD OF FORMING THE SAME
Filed Aug. 6, 1929
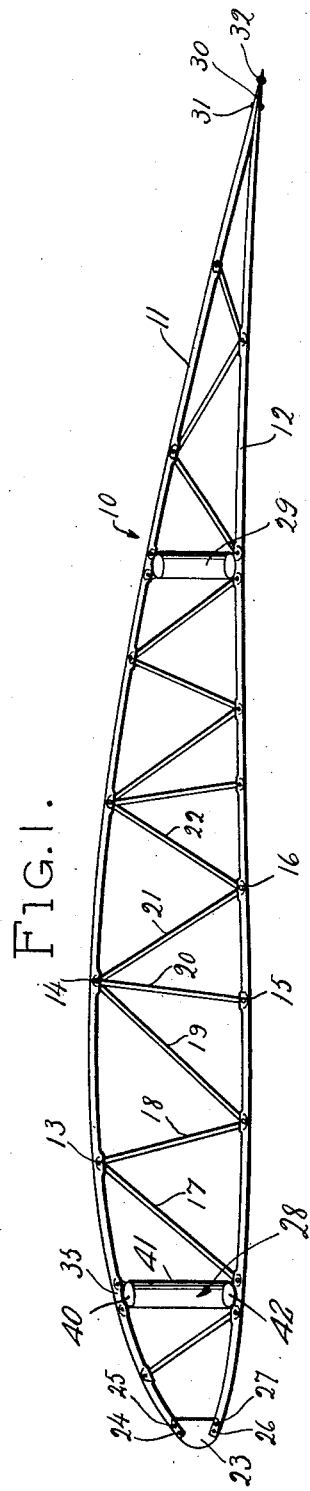
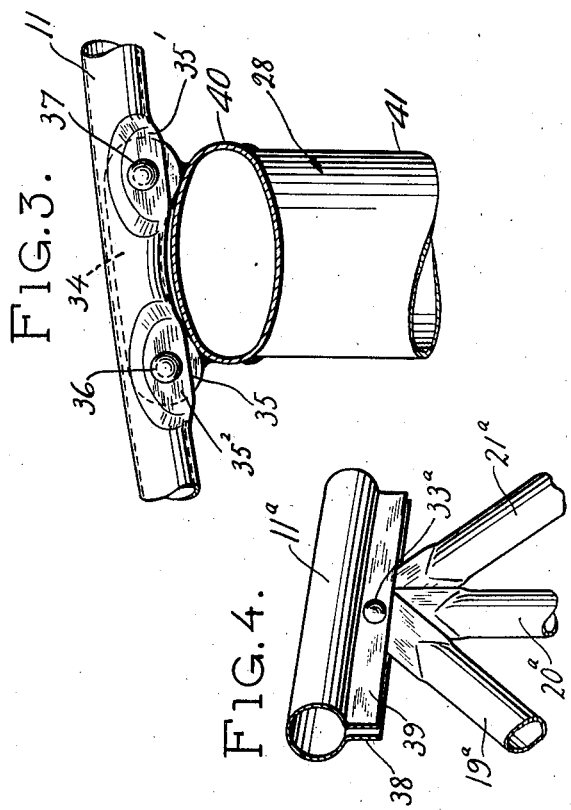
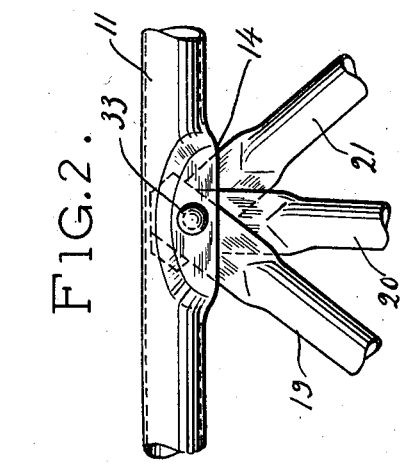
INVENTOR
Charles E. Hathorn
BY
ATTORNEY Patented May 16, 1933

1,908,757

UNITED STATES PATENT OFFICE

CHARLES E. HATHORN, OF HEMPSTEAD, NEW YORK, ASSIGNOR TO CURTISS AEROPLANE & MOTOR COMPANY, INC., A CORPORATION OF NEW YORK

AERONAUTICAL TRUSS AND METHOD OF FORMING THE SAME

Application filed August 6, 1929. Serial No. 383,926.

My invention relates to metallic structures and to methods for assembling the same, and more particularly to methods of joining metallic tubes for aeronautical trusses.

Aeronautical structures made up of tubes of certain metals have previously been used, but the tubes have usually been joined by welding. Such a method of joining has been impractical with certain other metals such as duralumin due to the fact that no safe method of welding it has been discovered. Metal tubes have also been joined by the use of fittings riveted to each of the tubes. Prior to my invention, no other method of joining the end of one tube to another, between the ends of the latter, had been extensively used.

One of the objects of my invention is to provide novel methods by which metal tubes may be joined.

A further object is to provide methods for the construction of aeronautical trusses of great strength and rigidity and of minimum weight.

A further object of my invention is to provide economical methods of construction of aeronautical trusses of efficient and simple design.

A further object of my invention is to provide simplified methods of construction and assembly of aeronautical trusses.

A further object is the elimination of fittings in riveting metal tubes together.

A more specific object is to provide a structure comprising a tube riveted at one end to another tube between the ends of the latter and to provide methods of riveting the tubes together.

Further objects will be apparent from a reading of the sub-joined specification and claims and from a consideration of the drawing.

In order to more clearly explain the invention, two embodiments thereof are shown in the accompanying drawing in which:

Fig. 1 is a side elevation of a wing rib constructed according to my improved method.

Fig. 2 is an elevation of a detail of the structure shown in Fig. 1, shown on an enlarged scale, but with parts broken away;

Fig. 3 is a further detail of the structure shown in Fig. 1, shown on an enlarged scale, the top chord of the forward wing beam or spar being shown in sections; and Fig. 4 is a perspective view of a detail of a modified form of joint constructed according to my invention.

In general, the structure used for illustration of the preferred form of my invention comprises a wing rib, made up of two chord members, bent to the desired configuration, and joined to each other by rivets, by suitable plates and by large and small bracing members. The chord members are formed of hollow tubes having slits formed at suitable intervals therein for the reception of the flattened ends of the smaller bracing members of the rib, for the reception of a nose plate likewise forming a part of the completed rib, and for the reception of fittings connected to the wing spars or beams of the completed wing structure. In the construction of the rib, after the bracing members and fittings are inserted in the slits, the tubular chord members are flattened and pressed together adjacent to the slits, and rivets are forced through the flattened portions of the chords and bracing members to join them together and form thereby a rigid structure.

Referring particularly to the drawing, a wing rib generally designated as 10 is shown as made up of two chord members 11 and 12, each of which is formed from a tube of suitable metal. At suitable intervals along each of these chord members, as at 13, 14, 15 and 16, the inner sides of the tubular members have been slitted for the reception of tubes which may be of slightly smaller dimensions than the chords 11 and 12, and form internal bracing members or struts, such as 17, 18, 19, 20, 21 and 22. Suitable slits are also formed in the forward end of the chord members 11 and 12 and a nose plate, 23, is inserted in the slits and riveted as at 24, 25, 26 and 27 to said chord members. The rear ends of the chord members 11 and 12 may be flattened as at 30, and fastened together by rivets 31 and 32.

As shown more particularly in Fig. 2, the internal bracing members, such as 19, 20 and 21 have flattened ends which are inserted in the slits as at 14, and adjacent portions of the tubular chord members are subsequently flattened to contact with the flattened ends of the internal members. Rivets such as the rivet 33 are inserted through the flattened portions to join and hold the tubular chord members rigidly to the internal bracing members.

Wing spars 28 and 29, as shown in Fig. 1, pass through the various ribs in a direction normal to the fore and aft axis of the ribs. Each spar 28 and 29 is substantially the same. In the present embodiment, the spar 28 comprises an upper elliptical hollow metal chord member 40, and a lower elliptical hollow metal chord member 42, these members running transversely of the wing. Spacing of the chord members 40 and 42 is effected by any suitable web, as 41.

In Fig. 3, the upper spar chord member 40 is shown in section, and to this is attached a fitting 34, shown partially in dotted lines where it lies within the tubular rib chord member 11. The fitting 34 consists of a formed flat plate attached to the spar chord member 40 of the spar 28, to engage the slit 35 of the rib chord member 11. This fitting 34 may be attached to the spar chord member 40 by welding, or by other suitable means if the spar be fabricated from material not adapted for welding. Similar fittings to 34 are similarly attached to the lower spar chord member 42 for engaging the lower rib chord member 12, and to the upper and lower chord members of the spar 29 for holding the rearward portions of the rib chord members 11 and 12. A part of this fitting may be inserted through an enlarged slit, as at 35, in the chord member 11 and said chord member 11 flattened at points $35^1$ and $35^2$ along said slit. Rivets 36 and 37 may then be inserted through the flattened portions of the tube 11 and through the fitting 34 to fasten the fitting 34 to the chord 11, and thus to secure rigidly the internal bracing member 28 to the chord member.

In the process of forming a wing rib or other aeronautical truss member according to my preferred method, metallic tubes are drawn of suitable size and thickness but preferably of much thinner construction than tubes are ordinarily drawn, and of a suitable metal such as duralumin. These tubes are annealed to allow bending thereof and are bent in jigs to the desired configuration to form the chord members of the truss. At suitable intervals along the length of each chord, slits are formed in the inner side thereof by sawing the tube while it is held in a jig. Other tubes of suitable size and material are cut into suitable lengths to form internal bracing members, and have their ends flattened for insertion in the slits in the chord members. The ends thereof may be sawed off at suitable angles so that they will fit within the interior of the tubular chord members. The ends of the internal bracing members are inserted in the slits, and the tubular chord members are then flattened at the points adjacent the slits to contact firmly with the flattened ends of the internal bracing members. Rivets are inserted through the contacting portions of the flattened tubular chord members and the flattened ends of the internal bracing members to join the elements together securely and firmly. The forward ends of the tubular chord members are also slitted for a suitable distance rearwardly therefrom and a suitable nose plate is inserted and riveted within these slits. The rear ends of the tubular chord members are flattened and rivets are inserted therethrough to securely fasten the rear ends of the chord members together.

In the modified form of my invention illustrated in Fig. 4, the chord members for the rib may be constructed from sheets of metal. In the formation thereof, annealed sheets of a suitable metal such as duralumin are cut in lengths suitable to the length of the chord member to be formed therefrom and in suitable widths. The sheets of metal are then bent along lines longitudinal thereof to the desired form so that a tube shaped metallic element is formed having flanges extending transversely therefrom and having a longitudinal slit formed between the flanges, as is all clearly illustrated in said Fig. 4. The tube shaped elements are then bent to the desired configuration to form the chord members. Tubes for forming the web or bracing members of the rib may then be placed between the chord members and the ends thereof inserted between the extending flanges and fastened thereto by rivets. Thus, in Fig. 4 the tube shaped chord member 11a has substantially parallel, transversely extending flanges 38 and 39 between which may be inserted the ends of the web members 19a, 20a and 21a and the rivet 33a may be forced through the contacting flanges and the flattened ends of the tubes 19a, 20a and 21a to securely fasten the structure together.

The form of my invention illustrated in Figs. 1, 2 and 3 is the preferred form thereof, inasmuch as the elimination of the flanges 38 and 39 decreases the weight of the wing ribs materially and the use of a complete tube instead of the tube shaped metallic element 11a increases the strength of the chord members. Moreover, by reason of the use of standardized tubes, the cost of the formation of the chord members is decreased below the cost of forming the chords by bending the metallic sheets.

It is to be understood that the above described embodiments of my invention are for the purpose of illustration only, and various changes may be made therein without departing from the spirit and scope of the invention.

I claim as my invention:

1. The method of joining metal tubes which comprises forming a hole in a side of one of the tubes, flattening an end of another tube, inserting the flattened end of the second tube within the hole in the first tube, flattening the first tube adjacent to the inserted end of the second tube so that the flattened sides of the tubes contact with each other, and fastening the contacting portions together.

2. The method of joining metal tubes which comprises sawing one of the tubes at intervals along its length to form a plurality of slits in the side thereof, flattening an end of a second tube, inserting the flattened end of the second tube within one of the slits formed in the first tube, flattening the first tube adjacent to the slit so that the flattened sides thereof contact with the flattened end of the other tube, and fastening the contacting flattened portions together.

3. The method of joining metal tubes which comprises forming a slit in a side of one of the tubes, flattening an end of a second tube, inserting the flattened end of the second tube within the slit in the first tube, flattening the first tube adjacent to the slit so that the flattened sides thereof contact with the flattened end of the other tube, and forcing a rivet through the contacting portions to fasten them together.

4. The method of forming a truss rib for an aeronautical wing which comprises cutting tubes into suitable lengths to form the top and bottom chord members of the rib, bending the tubes to a suitable shape therefor, forming holes on the inner side of each of said tubes at suitable points, cutting other tube members of suitable shorter lengths to form tension and compression members within the said rib, flattening the ends of the said shorter tubes, placing the chord members in suitable position and inserting the flattened ends of the bracing members within the holes in the chord members so that some of the bracing members are positioned substantially perpendicular to the chord members and so that others of the bracing members are positioned at oblique angles with the chord members, fastening the forward ends of the said chord members to each other and the rear ends of the said chord members to each other, flattening the chord members adjacent to the said holes so that the sides of the tubes forming the chord members will contact with the flattened ends of the bracing members, and fastening together the contacting portions of the chord members and the bracing members.

5. A metal rib for aircraft comprising a chord of substantially closed hollow section, a connecting web in which the web members have flattened ends and in which the said flattened ends intersect adjacent to the point of attachment, and common means for attaching the intersecting web members to the chord.

6. A metal truss comprising a plurality of curved tubular members having slits formed on their inner sides at suitable intervals between their ends, a plurality of shorter tubular members having flattened ends positioned in the slits in the first mentioned tubular members said shorter tubular members being positioned substantially perpendicular to the first mentioned tubular members, a plurality of other shorter tubular members also having flattened ends inserted within slits in the first mentioned tubular members and positioned at oblique angles with the first mentioned tubular members, and rivets inserted through the contacting portions of the first mentioned tubular members and the other tubular members.

In testimony whereof I hereunto affix my signature.

CHARLES E. HATHORN.